June 10, 1969     D. S. WILSON     3,449,605

COOLING ARRANGEMENT FOR FAN-MOTOR COMBINATION

Filed March 30, 1966

INVENTOR.
DONALD S. WILSON

BY
Brumbaugh, Free, Graves & Donohue his     ATTORNEYS

United States Patent Office 3,449,605
Patented June 10, 1969

3,449,605
COOLING ARRANGEMENT FOR FAN-MOTOR COMBINATION
Donald S. Wilson, Latham, N.Y., assignor to Rotron Manufacturing Company, Inc., Woodstock, N.Y., a corporation of New York
Filed Mar. 30, 1966, Ser. No. 538,686
Int. Cl. H02k 9/06
U.S. Cl. 310—58        8 Claims

ABSTRACT OF THE DISCLOSURE

A cooling arrangement for a fan including an electric motor having an air-moving element secured about its periphery to establish a main air stream axially thereof. Openings are formed at each end of the motor housing to provide access for cooling air to pass through the motor and annular air passages, formed around the motor, acting as Venturis, respond to the main air stream to establish cooling air flows through the motor without additional air-moving elements.

---

The present invention relates to means for cooling electric motors which drive air moving devices, and more particularly, to an improved fan construction that employs the air stream and pressure gradients established during normal operation of the fan to create separate air flows for cooling the fan driving motor, without the addition of extra air moving elements.

As is well known, as the load on an electric motor increases, the power dissipated similarly increases. The resultant heating of the windings, if allowed to continue unchecked, can significantly shorten the motor life. In the case of some types of air moving devices or fans, an increase in outlet pressure, such as resulting from impediments in the main air stream, loads the driving motor and causes increased power dissipation. It is desirable, from an efficiency and reliability standpoint, that means be provided to remove excess heat from the motor and preferably that this cooling ability vary with the load so that a proper operational temperature can be maintained at all times.

Many prior art fans are designed such that the motor load decreases with increasing outlet pressure. In those cases, with the motor located in the main air stream created by the air moving element, e.g., a propeller, adequate cooling is available despite the decreased flow associated with increased outlet pressure due to the reduction in motor power. One other widely used fan configuration, however, poses problems which are not so readily soluble. In particular, those fans wherein the blade elements radially extend from a rotating hub surrounding all or part of the motor, thereby maintaining the axial length of the fan at a minimum, inherently keep the motor out of the main air stream or expose it to but a small fraction of it, and accordingly cannot rely on the main air stream for cooling purposes. Furthermore, if the fan characteristics are such that motor load increases as the fan outlet is impeded, the problem becomes even more difficult.

In connection with the latter type of fan, it is known to establish an air flow path or paths across or through the motor structure itself by means of auxiliary impellers or blades which may either be driven by the motor itself or by an auxiliary motor of relatively low power. While these configurations offer advantages in large motors having ample room for additional air moving elements, they are in general inappropriate for smaller fans where space is at a premium and economy of manufacture a factor. Moreover, the added power required to drive the supplemental impeller can affect the efficiency of the overall fan to an extent which may not be permissible in a unit of limited size and power.

Accordingly, it is the primary object of the present invention to provide an improved configuration for cooling an electric motor of a fan that overcomes the disadvantages of prior art arrangements.

It is a further object of the present invention to provide a cooling arrangement for a fan motor which employs only the air stream and pressure gradients resulting from normal operation of the fan to establish the cooling air flows.

An additional object of the invention is to provide such an improved fan motor cooling arrangement in which the cooling capacity varies with the load on the fan, thereby providing a more effective cooling action.

Yet another object of the present invention is to provide an improved cooling arrangement for a fan motor in which each end of the motor is separately cooled and thereby achieves more efficient cooling, without additional air moving elements.

Briefly, in accordance with the present invention, the fan motor itself is housed in a generally cylindrical can closed at both ends and provided with openings in each end as well as circumferentially about the cylindrical portion of the housing near each of the end faces. The fan blades are secured to a cup-shaped hub which surrounds the downstream end of the housing and is mounted on a shaft extending from the corresponding end face. The end wall of the hub is apertured to permit the flow of air to the housing.

The other or upstream end of the motor is retained in a cup-shaped support having a base portion provided with apertures to permit air flow into the openings in the associated end face. The wall of the support snugly receives the cylindrical portion of the housing along part of its length, but is radially spaced from the periphery opposite the circumferential openings, terminating just slightly beyond these openings. The result is an annular air gap around the motor housing which acts in conjunction with the main air stream to establish a pressure low with respect to the ambient pressure outside of the support. This creates an air flow through the openings in the upstream end face of the motor housing and out of the adjacent circumferential openings in the cylindrical portion of the housing.

At the same time, the main air stream pressure gradient established by the propeller blades creates an air flow through the motor housing in a direction opposite to the main flow. This cooling air enters the openings in the hub end wall, passes through the openings in the associated end face of the housing and then exits into the main air stream from the openings in the cylindrical portion of the housing.

Thus, two separate flows for cooling the motor are created, maintaining each end of the motor separately cool without creating a large pressure drop across the motor which would interfere with the overall performance of the fan. Since the pressure gradient across the fan blade increases as the load increases, the cooling flow correspondingly increases, thereby automatically adjusting for changes in motor heating.

The entire fan structure may be mounted within a tubular duct or venturi supported by struts or a spider extending from the support at the upstream end of the fan.

The foregoing and other objects, features and advantages of the invention will become more apparent from the following detailed description thereof, when taken in conjunction with the appended drawings, in which.

Figure 2:
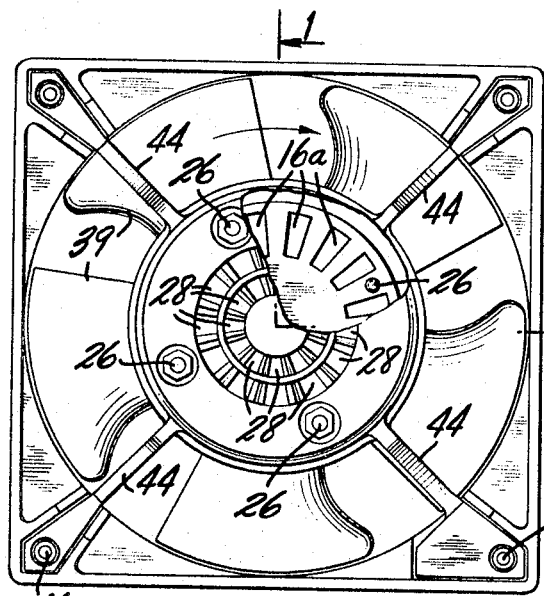
FIGURE 2 is an elevation of the fan configuration of the invention looking from the upstream side and partially broken away to show the upstream end face of the motor housing.

Turning now to the drawings, the fan motor 10 includes a can-like outer housing 12 including a cylindrical portion 14 and a pair of end faces 16 and 18. As will become evident hereinafter, the end face 16 is at the upstream end of the fan while the end face 18 is at the downstream end.

Figure 3:
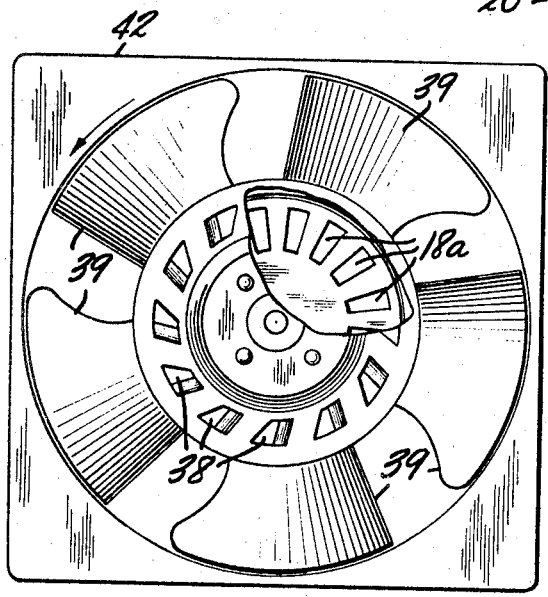
FIGURE 3 is an elevation view of the downstream end of the fan configuration partially broken away to show the downstream end face of the motor housing.

The upstream end face 16 of the housing is provided with one or more openings 16a (FIGURE 2) while the downstream end face 18 has a similar plurality of openings 18a (FIGURE 3). The cylindrical portion of the housing 14 includes two sets of openings extending circumferentially therearound. A first set, 14a, is situated adjacent the upstream end face 16, while the other set 14b is located adjacent the downstream end face 18.

The motor is held by a cup-shaped support 20, having a base portion 22 and a generally cylindrical wall 24, within which the upstream end of the motor housing is snugly received. A plurality of threaded lugs 26 are provided in the upstream end wall 16 and extend through appropriate openings in the base portion 22, to be engaged by suitable nuts to hold the support fast to the motor housing.

The interior surface of the base 22 preferably is spaced from the end face 16 of the motor housing over its entire surface, except where the lugs 26 pass therethrough. Apertures 28 are provided in the base 22 to permit free flow of air from the surrounding atmosphere into the opening 16a in the upstream end face.

The interior surface of cylindrical wall 24 of the support snugly receives the end of the cylindrical portion 14 of the housing, from the upstream end thereof to a point just short of the circumferential openings 14a. Thereafter, a radial clearance is provided about the cylindrical portion 14 extending somewhat upstream of the openings 14a where the wall 24 terminates, to provide an annular chamber opening into the main air stream region of the fan.

The downstream end of the motor 10 includes a shaft 30 extending axially therefrom to which is secured a propeller hub 32. The hub includes an end wall 34 and an axially extending, cylindrical side wall 36. A plurality of fan blades 39 extend radially from the side wall 36 and when rotated in the direction indicated in FIGURES 2 and 3, create a main air stream going from left to right as indicated by the arrows M in FIGURE 1. The hub 32 is secured to the shaft 30 by means of a mounting ring 33 riveted to the end wall and having a bore to receive the end of the shaft. A set screw or other suitable means is employed to lock the hub to the shaft for rotation therewith.

The end wall 34 of the hub is also provided with a plurality of openings 38 (see FIGURE 3) to permit air to flow from the exterior of the fan into the openings 18a in the downstream end of the motor housing 12. As indicated in the drawings, the radially extending sides of the openings 38 may be beveled in a direction consistent with the direction of rotation of the hub to facilitate the passage of air through the openings and into the motor housing.

The interior surface of the side wall 36 makes a running fit with the cylindrical portion 14 of the housing, that is while permitting free rotation, it prevents substantial air flow between the parts. Thus, the cooling air is constrained to flow into the openings in the end face 18.

The running fit extends along the housing from its downstream end to a point short of the openings 14b. Thereafter, an increased radial clearance is provided to allow ready egress of air from the openings 14b into the main air stream.

Figure 1:
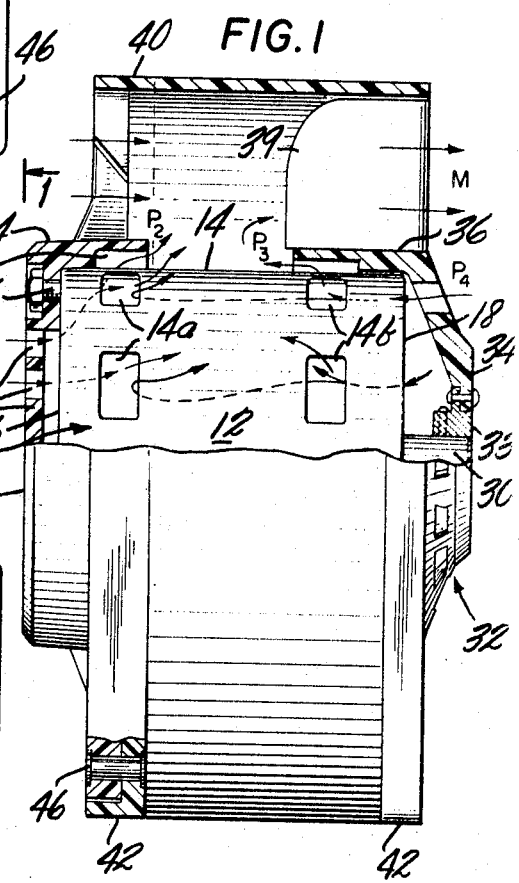
FIGURE 1 is a side view of a fan configuration in accordance with the invention in partial cross-section showing the various air paths created, the cross-section being taken along the lines 1—1 of FIGURE 2.

The foregoing fan structure may be mounted within a tubular duct or venturi 40. In the embodiment illustrated, the duct 40 is formed integrally with a pair of rectangular frame members 42 and connected to the support 20 by a plurality of struts 44 (see FIGURE 2). As seen in FIGURE 1, the latter may be riveted or otherwise fastened to the frame portions 42 such as by rivets 46. One of the struts 44 may also be formed with an internal passage to conduct the electrical leads (not shown) from the motor. It will be understood, of course, that the specific form of duct illustrated is by way of example only, and other construction may be employed.

In operation, as the propeller blades 39 are rotated by the motor 10, a main air stream M is created in the annular region between the exterior of the motor and the duct 40. As the flow is restricted, such as by the obstruction afforded by the apparatus that the fan is intended to cool, the pressure at the outlet, $P_4$, increases. With the increased pressure, an increased load is imposed upon the motor with the consequent increase in internal motor heat.

Under free flow, or minimal outlet pressure operation, air flow M flowing over the wall 24 of the support 20 creates a low pressure $P_2$ at its upstream end by virtue of the venturi effect. This induces a pressure difference between $P_1$ and $P_2$, thereby creating a cooling flow through the upstream end of the motor via the apertures 28 in the support, the openings 16a in the upstream end face of the motor housing and out the circumferential openings 14a into the main air stream. At the same time, the fan inlet pressure $P_3$ at the upstream edge of the fan blades will be less than the outlet pressure $P_4$. Thus, there will be a flow of cooling air over the downstream end of the motor via the apertures 38 in the propeller hub, the openings 18a in the downstream end face of the motor housing and out of the circumferential openings 14b into the main air stream. Through these means, both ends of the motor are cooled using the pressure gradients existing within the flow stream.

As the flow of the main air stream becomes restricted, such as by working into an increased pressure region, the pressure at $P_2$ and $P_3$ increases, approaching that at the inlet $P_1$. This tends to reduce the cooling air flow through the upstream end of the motor. At the same time, however, the pressure at $P_4$ increases at a greater rate than $P_3$. The resultant higher pressure difference between $P_4$ and $P_3$ increases the cooling flow at the outlet end of the motor. In addition, the higher pressure at $P_4$ induces a cooling flow through substantially the entire housing to the openings 14a at the upstream end of the cylindrical portion of the housing. The loss in cooling at the inlet end of the motor is thereby supplemented by the counter flow from the outlet end of the fan.

It will be recognized from the various pressure relationships resulting from operation of the fan that as the motor load increases, the pressure at $P_4$ and the flow of cooling air through the motor increase, with the result that a relatively constant motor temperature is maintained automatically over the complete range of operation of the fan.

As will be seen from the foregoing, the present invention provides for efficient cooling of a fan motor employing the natural air flows and pressure gradients established by the normal operation of the fan, without the addition of special air moving elements to create the necessary air flow. Moreover, the respective ends of the fan are independently cooled by cooling air flowing in opposite directions. Therefore, large pressure drops across the motor are avoided. All of the foregoing is achieved by means of a simple, inexpensive fan construction which lends itself to use in fans designed to occuppy minimal space and operation at high efficiencies.

It will be recognized that various modifications of the particular constructional details of the above-described embodiment of the invention will readily occur to persons skilled in the art witout departing from the principles of the invention. Accordingly, the invention is intended to be limited only by the scope of the appended claims.

What is claimed is:

1. A self-cooled fan configuration comprising an electric motor enclosed in a housing, an air-moving element driven by said motor to produce a main air stream axially of said motor, said air-moving element being mounted about the periphery of said housing, openings in said housing at each of the upstreams and downstream ends of said motor, and passage means adjacent said openings responsive to said main air stream to establish motor-cooling air flows from each end of said fan configuration through the openings at the respective ends of said housing and back into said main air stream.

2. The fan configuration of claim 1 above wherein said housing includes a cylindrical portion and a pair of end faces, and wherein said openings are provided in both of said end faces and in said cylindrical portion spaced circumferentially thereabout adjacent each of said end faces, whereby said cooling air may flow in through the openings in the respective end faces and out of the circumferential openings in said cylindrical portion.

3. The fan configuration of claim 2 above wherein one end of said motor housing is secured in a cup-shape support, said support including a base portion spaced from the associated end face of said housing and provided with at least one aperture to permit air flow to the openings in said end face, and wherein said passage means includes an axially extending wall portion surrounding a part of said cylindrical portion of said housing adjacent said one end, said wall portion being radially spaced from said cylindrical portion opposite the circumferential openings therein adjacent said one end, to provide an annular gap surrounding said circumferential openings to enable air flow therefrom to enter into the main air stream.

4. The fan configuration of claim 3 above wherein said motor includes a shaft extending through the end face at the other end of said housing and said air moving element comprises a plurality of blades mounted on a hub, said hub having an end wall adapted to be secured to said shaft and spaced from the associated end face of said housing, and wherein said passage means includes an axially extending side wall surrounding a part of said cylindrical portion of said housing and extending beyond the circumferential openings therein adjacent said other end, said side wall being radially spaced over its entire length.

5. The fan configuration of claim 4 above wherein the end wall of said hub is provided at least one aperture permitting air flow to said openings in the associated end face of said housing.

6. The fan configuration of claim 5 above wherein the radial spacing of said side wall from said cylindrical portion of the housing between said other end of the housing and the adjacent circumferential openings is sufficient only to permit relative rotation therebetween, and substantially greater over the remaining length of the side wall, to enable air flow out of said circumferential openings to enter into the main air stream.

7. The fan configuration of claim 6 above further comprising a member defining a generally cylindrical channel for said main air stream, said member surrounding said blades and maintained substantially concentric with said shaft by means extending from said support.

8. A self-cooled fan configuration comprising an electric motor enclosed in a housing, said housing including a cylindrical portion and a pair of end faces, openings in said housing on both of said end faces and spaced circumferentially about said cylindrical portion adjacent each of said end faces, one end of said motor housing being secured in a cup-shaped support, said support including a base portion spaced from the associated end face of said housing and provided with at least one aperture to permit air flow to the openings in said end face, and an exially extending wall portion surrounding a part of said cylindrical portion of said housing adjacent said one end, said wall portion being radially spaced from said cylindrical portion opposite the circumferential openings therein adjacent said one end to provide an annular air gap, said motor including a shaft extending through the end face at the other end of said housing and carrying a hub thereon, said hub having an end wall adapted to be secured to said shaft and spaced from the associated end face of said housing, and an axially extending side wall surrounding a part of said cylindrical portion of said housing and extending beyond the circumferential openings therein adjacent said other end, and including a recessed portion overlapping the radially spaced openings in the other end of said housing to enable air flow out of said circumferential openings to enter into the main air stream, and an air-moving element mounted on the side wall of said hub, thereby establishing motor-cooling air flow from each end of said fan through the openings at the respective ends of said housing and back into said main air stream.

References Cited

UNITED STATES PATENTS 3,274,410   9/1966   Bonie _____ 310—62

FOREIGN PATENTS 967,315   10/1950   France.

WARREN E. RAY, *Primary Examiner.*

R. SKUDY, *Assistant Examiner.*

U.S. Cl. X.R.

310—62